United States Patent
Shen

(10) Patent No.: US 7,035,188 B2
(45) Date of Patent: Apr. 25, 2006

(54) CONTROL METHOD OF THE MOTOR ROTATION SPEED USED IN AN OPTICAL DISC DRIVE

(75) Inventor: Yung-Chi Shen, Taipei (TW)

(73) Assignee: Mediatek, Inc., Hsinchu (TW)

( * ) Notice: Subject to any disclaimer, the term of this patent is extended or adjusted under 35 U.S.C. 154(b) by 665 days.

(21) Appl. No.: 10/313,361

(22) Filed: Dec. 6, 2002

(65) Prior Publication Data

US 2003/0107964 A1 Jun. 12, 2003

(30) Foreign Application Priority Data

Dec. 7, 2001 (TW) .......................... 090130457

(51) Int. Cl.
*G11B 7/00* (2006.01)

(52) U.S. Cl. ..................................... 369/53.3
(58) Field of Classification Search ................. 369/53.3, 369/47.38, 47.39, 47.48
See application file for complete search history.

(56) References Cited

U.S. PATENT DOCUMENTS 5,220,257 A * 6/1993 Yoshino et al. ............. 318/254

* cited by examiner

*Primary Examiner*—Nabil Hindi
(74) *Attorney, Agent, or Firm*—Thomas, Kayden, Horstemeyer & Risley

(57) ABSTRACT

A control method for a rotation speed is used in an optical disc drive. When the angular velocity of the optical disc in rotation is fixed and the rotation direction is the same as the direction of the torque, then a breaking torque, having the same magnitude as the rotational torque but in the opposite direction, is applied to cause the rotation of the optical disc to cease. In other situation, a fixed rotational torque of the same magnitude as that of the angular velocity is first applied to cause the optical disc to have a fixed angular velocity. Then, a breaking torque having the same magnitude as the fixed rotational torque but in the opposite direction is applied to cause the rotation of the optical disc to cease. In this manner, no matter what rotation speed of the optical disc is, the rotation of the optical disc can always be ceased by a fixed period of time.

2 Claims, 1 Drawing Sheet

CONTROL METHOD OF THE MOTOR ROTATION SPEED USED IN AN OPTICAL DISC DRIVE

This application incorporates by reference Taiwan application Serial No. 090130457, filed on Dec. 7, 2001.

BACKGROUND OF THE INVENTION

1. Field of the Invention

The present invention relates to a control method of the motor rotation speed, and more particularly, the present invention relates to a control method of the motor rotation speed used in an optical disc drive.

2. Description of Related Art

As the need for high memory capacity to store the media information increases, the use of the optical disc plays an important role. An issue that remains to be solved by manufacturers is how to read the information on the optical disc at a fast speed and stable quality, so as to reduce the data access time.

Referring to FIG. 1, a block diagram, schematically illustrates the circuit of a conventional control system 100 of the motor rotation speed used in an optical disc drive. In the conventional optical disc drive, the optical disc 102 is disposed on a spindle motor 104. The spindle motor 104 is used to rotate the optical disc 102 according to the control signal of rotation speed (DMO) outputted by a motor control apparatus 106. The spindle motor 104 and a frequency generator (FG) 108 are coupled together, in which the frequency generator 108 will output the frequency signal of rotation speed (SF), according to the rotation speed of the optical disc 102, and feed it back to the motor control apparatus 106. The motor control apparatus 106 includes a microprocessor 108 and a digital signal processor (DSP) 110, and outputs the control signal of rotation speed (DMO) to the spindle motor 104, according to the frequency signal of rotation speed (SF) and a current operation status of the optical disc drive. In this manner, the optical disc drive can achieve the control action of the rotation speed on the optical disc 102 by using the control system 100 of the rotation speed in a type of closed loop.

There are a number of tracks on the optical disc 102 for storing the digital information, in which the digital information is to be read by an optical pickup head. When reading the digital information, the optical pickup head needs to move to a proper position to perform the reading operation, in accordance with the different position of the digital information stored on the optical disc 102. At the same time, the control system 100 of the rotation speed also needs to control the rotation speed of the optical disc 102, according to the position of the digital information stored on the optical disc 102. For example, the rotation speed of the optical disc 102 is faster when reading the digital information stored closer to the center of the optical disc 102. On the contrary, when the digital information has been stored closer to the outer edge of the optical disc 102, the rotation speed of the optical disc 102 is slower.

When the rotation of the optical disc 102 is intended to be ceased, the motor control apparatus 106 will output a control signal of rotation speed (DMO), according to the frequency signal of rotation speed (SF) fed by the frequency generator 108, so as to allow the spindle motor 104 to apply a torque on the optical disc 102 and thereby decrease the rotation speed of the optical disc 102. Wherein, the direction of the torque applied on the optical disc 102 is opposite to the rotation direction of the optical disc 102. When the motor control apparatus 106 has detected a zero rotation speed of the optical disc 102 by the frequency signal of rotation speed (SF) outputted by the frequency generator 108, then the control signal of rotation speed (DMO) stops outputting. For clarity of description, the time period, from when the optical disc 102 is intended to be ceased to when the optical disc 102 is decreased to zero, is called the braking time period herein.

The drawbacks for the conventional control system of the rotation speed are as follows: firstly, it requires a frequency generator to output the feedback signal. Secondly, the design for the conventional control system for the rotation speed in a closed loop would be more complicated and the fabrication cost would be higher.

SUMMARY OF THE INVENTION

It is therefore an object of the present invention to provide a control method for the motor rotation speed used in an optical disc drive. As a result, the rotation of the optical disc can always be ceased by a fixed period of time, regardless of the disc's rotation speed. At the same time, the complexity of the circuit design of the control system of the rotation speed can be reduced, and the fabrication cost can thereby be reduced.

In accordance with the foregoing and other objects of the present invention, the invention provides a control method of a motor rotation speed used in an optical disc drive, so that the rotation of the optical disc can always be ceased by a fixed period of time, no matter what the rotation speed of the optical disc is. The method includes at least the following steps. First, the method checks the angular velocity of the optical disc according to the data reading condition of the optical disc and the current operation status of the optical disc drive and checks the rotational torque of the optical disc. When the rotational angular velocity of the optical disc does not change with time, and the direction of the angular velocity is the same as the direction of the rotational torque, a breaking torque is applied to the optical disc, so as to cease the rotation of the optical disc. Wherein, the magnitude of the breaking torque is equal to the magnitude of the rotational torque, and the direction of the breaking torque is opposite to the direction of the rotational torque. When the angular velocity of the optical disc changes with time, or the direction of the angular velocity is opposite to the direction of the rotational torque, a fixed torque is first applied on the optical disc, so as to cause the optical disc to have a fixed angular velocity. Wherein, the direction of the fixed torque is the same as the direction of the angular velocity, and the fixed angular velocity does not change with time. Then, a breaking torque is applied to the optical disc, so as to cease the rotation of the optical disc, wherein the magnitudes of the breaking torque and the fixed torque are the same, but the direction of the breaking torque is opposite to the direction of the fixed torque.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
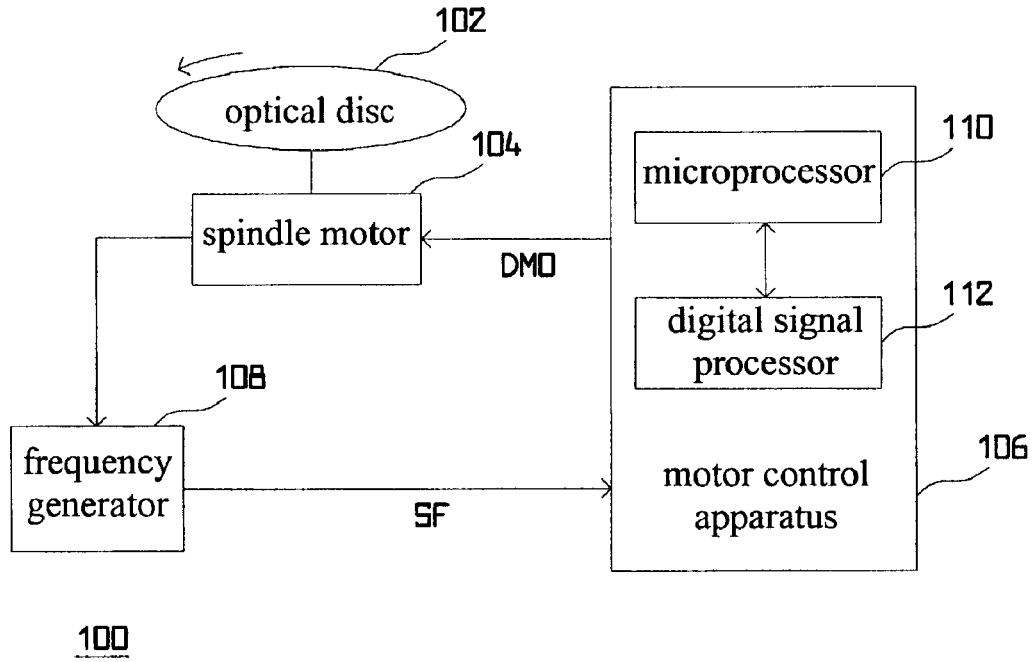
FIG. 1 is a block diagram schematically illustrating the circuit of a conventional control system of the motor rotation speed used in an optical disc drive.

The feature of the present invention is that no matter what the rotation speed of the optical disc is, the optical disc can always be ceased in rotation by a fixed period of time. The theoretical description is as follows:

In order to rotate the optical disc, a torque T needs to be applied to the spindle motor, and the torque T is related to the inertial angular moment J of the optical disc, the angular acceleration velocity 60, the friction coefficient f, and the angular velocity ω, as stated in Eq. (1).

$$T = J \times \alpha + f \times \omega, \qquad (1)$$

where the angular acceleration velocity α and the angular velocity ω are functions of time.

A Laplace transform is performed on Eq. (1), so that Eq. (2) is obtained as follows:

$$\frac{T}{s} = J(s \cdot \Omega(s) - \omega_o) + f \cdot \Omega(s) \qquad (2)$$

where s is the natural variable in the s-domain defined by the Laplace transform, $\Omega(s)$ is the representation of the angular velocity in the s-domain, and $\omega_o$ is the angular velocity for the optical disc in stable rotation.

After rewriting Eq. (2), Eq. (3) is obtained as follows:

$$\Omega(s) = (T/s)/s - (T/f - \omega_o)/(s + f/J). \qquad (3)$$

Again, an inverse Laplace transform is performed on Eq. (3) to obtain Eq. (4):

$$\omega(t) = T/f - (T/f - \omega_o)e^{-(f/J)t}, \qquad (4)$$

where t represents time.

Referring to Eq. (1) again, if the optical disc rotates at a fixed angular velocity $\omega_o$, then the spindle motor needs to apply a rotational torque on the optical disc with a magnitude satisfying the relation stated in Eq. (5) as follows:

$$T_0 = f \times \omega_o \qquad (5)$$

Referring to Eq. (4) and Eq. (5) at the same time, if the spindle motor applies a breaking torque on the optical disc with a stable rotation by the angular velocity $\omega_o$, so as to cease the rotation of the optical disc, in which the magnitudes of the breaking torque and the rotational torque $T_0$ are the same, but in opposite directions, then the time period of reducing the angular velocity $\omega_o$ to zero has the relation as stated in Eq. (6):

$$0 = -(T_0/f) - (-T_0/f - \omega_o)e^{-(f/J)t}, \qquad (6)$$

where "t" represents the breaking time period of ceasing the rotation of the optical disc. After rearrange Eq. (6), the final result is obtained as stated in Eq. (7):

$$\text{i } t = (J/f)\ln 2, \qquad (7)$$

where the inertial angular moment J and the friction coefficient f are constants, of which the quantities do not change as the angular velocity $\omega_o$ changes. According to Eq. (7), when the optical disc is rotating by a stable angular velocity $\omega_o$, if the spindle motor applies a breaking torque—To, which has the same magnitude as the rotational torque To but in the opposite direction, then no matter what the magnitude of the angular velocity is, the required breaking time period t is a constant.

Figure 2:
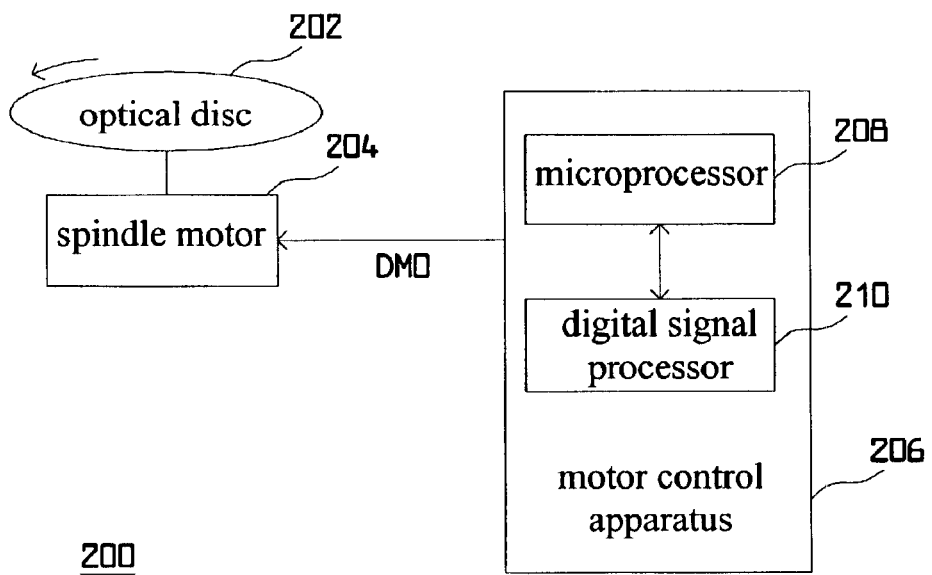
FIG. 2 is a block diagram schematically illustrating the circuit of a control system of the motor rotation speed used in an optical disc drive, according to the preferred embodiment of the present invention.

Referring to FIG. 2, a block diagram schematically illustrates the circuit of a control system 200 of the motor rotation speed used in an optical disc drive, according to the preferred embodiment of the present invention. The optical disc 202 is disposed on the spindle motor 204, which applies a torque on the disc 202, according to a control signal of rotation speed (DMO) outputted by a motor control apparatus 206, so as to rotate the optical disc 202. The motor control apparatus 206 includes a microprocessor 208 and a digital signal processor (DSP) 210, and outputs the control signal of rotation speed (DMO) to the spindle motor 204, according to a current operation status of the optical disc drive. In this manner, the optical disc drive can achieve the control action of the rotation speed on the optical disc 102.

Referring to FIG. 1 and FIG. 2 at the same time, the difference between the present invention and the conventional control system 100 of the rotation speed is that the control system 200 of the rotation speed of the present invention is a design of an open loop, and does not require the use of the frequency generator (FG) 108 to feed the frequency signal (SF) of rotation speed back to the motor control apparatus 106 for controlling the rotation speed of the optical disc 102. It should be noted that the motor control apparatus 206 is needed to determine the control method of the rotation speed for ceasing the rotation of the optical disc 202 according to the current operation status of the optical disc drive. If the operation status is different for the optical disc drive, then the control method of the rotation speed for ceasing the rotation of the optical disc 202 is also different. With respect to the different operation statuses, the control method employed by the control system 200 of the rotation speed to cease the rotation of optical disc is described in the following.

When the system is reading the digital information stored on the optical disc 202, the optical disc 202 rotates at a fixed angular velocity $\omega_o$. At this moment, the spindle motor 204 applies a rotational torque $T_0$ on the optical disc 202 in a direction the same as the direction of the angular velocity $\omega_o$. If the rotation of the optical disc 202 is to be ceased, then the motor control apparatus 206 uses the control signal of rotation speed (DMO) to control the spindle motor 204 and applies a breaking torque to the optical disc 202, so as to cease the rotation of the optical disc 202. Wherein, the breaking torque and the rotational torque have the same magnitude, but opposing directions. As a result, the rotation of the optical disc 202 will cease, no matter what the magnitude of the angular velocity $\omega_o$ of the optical disc 202 is, after a fixed period of time t.

As described above, when the system is reading the digital information stored on the optical disc 202, the rotation speed of the optical disc 202 will also change according to the different radial locations on the optical disc 202. For this reason, when the system is seeking the digital information on the optical disc 202, the rotation speed of the optical disc 202 is not stable. After the system has accomplished the seeking action, the spindle motor 204 starts to apply a rotational torque to the optical disc 202, so as to cause the optical disc 202 to rotate at a stable speed. When the system is seeking the digital information on the optical disc 202 and the rotation is desired to be ceased, the spindle motor 204 does not perform the breaking action at once, but waits a predetermined period of time. During the waiting period, the system will continue the action of reading the digital information, in which the motor control apparatus 206 uses the control signal of rotation speed (DMO) to control the rotation speed of the optical disc. After the optical disc rotates at a fixed angular velocity $\omega_o$, the motor control apparatus 206 again uses the control signal of rotation speed (DMO) to control spindle motor 204 by applying the breaking torque on the optical disc 202, so as to perform the breaking action on the optical disc 202. Wherein, the magnitude of the braking torque is the same as that of the rotational torque and the direction of the breaking torque is opposite to that of the rotational torque. As a result, no matter what the angular velocity $\omega_o$ of the optical disc 202 is, after the fixed breaking period of time t, the rotation of the optical disc can be ceased.

If the system is seeking or reading from the inner edge of the optical disc 202 to the outer edge, the spindle motor 204 will apply a rotational torque to the optical disc 202 and the direction is opposite to the rotating direction of the optical disc 202, causing the rotation speed of the optical disc 202 to be reduced over time. If the rotation of the optical disc 202 is intended to be ceased, then the motor control apparatus 206 will output a first control signal of rotation speed (DMO1), so as to allow the spindle motor 204 to apply a first torque T1 to the optical disc 202, in the same direction as rotation of the optical disc 202. At this moment, the optical disc 202 is affected by the applied first torque T1, and the rotation speed increases. Then, the motor control apparatus 206 again outputs a second control signal of rotation speed (DMO2), so as to allow the spindle motor 204 to apply a second torque T2 to the optical disc 202 in a direction the same as the direction of the optical disc 202 in rotation and the magnitude is predetermined by the system. As a result, after the optical disc 202 has been accelerated in rotation by first torque T1 and stabilized by torque T2, the optical disc is again rotating at a fixed rotation velocity $\omega_o$. At this moment, the spindle motor 206 again applies a breaking torque on the optical disc 202, so as to cease the rotation of the optical disc 202, wherein the magnitudes of the breaking torque and the second torque T2 are the same but their directions are opposite. As a result, after a fixed breaking period of time t, the rotation of the optical disc 202 will cease.

When the user wants to take the optical disc out, the system will perform a hardware reset action. At this moment, the spindle motor 204 will no longer apply the rotational torque to the optical disc 202. After a predetermined period of time, the optical disc is still freely rotating at a fast, but unstable speed. At this moment, if the rotation of the optical disc is to be ceased, then the process is similar to the foregoing descriptions. The motor control apparatus 206 first outputs a first control signal of rotation speed (DMO1), so as to allow the spindle motor 204 to apply a first torque T1 to the optical disc 202, in which the direction of the first torque T1 is the same as the direction of the optical disc 202 in rotation. At this moment, the optical disc 202 is driven by the applied first torque T1, and the rotation speed increases. Then, the motor control apparatus 206 again outputs a second control signal of rotation speed (DMO2), so as to allow the spindle motor 204 to apply a second torque T2 to the optical disc 202, in which the direction of the first torque is the same as the direction of the optical disc 202 in rotation but the magnitude is predetermined by the system. As a result, after the rotation of the optical disc 202 has been rapidly accelerated by first torque T1 and stabilized by second torque T2, the optical disc is again rotating at a fixed rotation velocity $\omega o$. Lastly, the spindle motor 206 again applies a breaking torque on the optical disc 202, so as to cease the rotation of the optical disc 202, wherein the magnitude of the breaking torque is the same as that of the second torque T2, but the direction of the breaking torque is opposite to that of the second torque T2. A breaking action is performed on the optical disc 202, and as a result, after a fixed breaking period of time t, the rotation of the optical disc 202 will cease.

In conclusion, the embodiment of the present invention has disclosed the control method for the rotation speed on a motor used in an optical disc drive. The present invention first applies a rotational torque to the optical disc, so as to produce a fixed rotation speed. Then, a breaking torque having the same magnitude but opposite direction as the rotational torque is applied, so that no matter what the rotation speed of the optical disc is, all rotation can be ceased within a fixed period of time.

In addition, the control system of the rotation speed can be implemented by an open loop circuit to take the place of the conventional closed loop circuit. In this manner, the complexity of the circuit design of the control system of the rotation speed can be reduced, and the fabrication cost can also thereby be reduced.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A control method of a motor rotation speed used in an optical disc drive, to control a rotation speed of an optical disc in the optical disc drive, the control method of the motor rotation speed at least comprising the following steps of:

checking an angular velocity of the optical disc according to a data reading condition of the optical disc and a current operation status of the optical disc drive and checking a rotational torque of the optical disc;

applying a breaking torque to the optical disc so as to cease the rotation of the optical disc if the angular velocity of the optical disc does not change with time, and a direction of the angular velocity is the same as a direction of the rotational torque, wherein a magnitude of the breaking torque is the same as a magnitude of the rotational torque, and a direction of the breaking torque is opposite to the direction of the rotational torque, wherein no matter what the rotation speed of the optical disc is, the rotation of the optical disc can always be ceased by a fixed period of time;

applying a first torque to the optical disc, so as to cause the optical disc to have a first angular velocity, if the angular velocity of the optical disc changes with time, or the direction of the angular velocity is opposite to the direction of the rotational torque, or the magnitude of the rotational torque is zero, wherein a direction of the first torque is the same as the direction of the angular velocity, and the first angular velocity does not change with time; and applying a second torque to the optical disc, so as to cease the rotation of the optical disc, wherein a magnitude of the second torque is the same as a magnitude of the first torque, and a direction of the second torque is opposite to the direction of the first torque, wherein no matter what the first rotational angular velocity is, the rotation of the optical disc can always be ceased by the fixed period of time.

2. A control apparatus of a motor rotation speed used in an optical disc drive, so as to control the rotation speed of an optical disc, the control apparatus of the motor rotation speed at least comprising:
- a motor control apparatus, used to output a control signal of rotation speed according to a current operation status of the optical disc drive; and
- a spindle motor, coupled together with the motor control apparatus, used to output a rotational torque, according to the control signal of rotation speed, so as to control the optical disc to rotate at a stable angular velocity;

wherein, according to the control signal of rotation speed, when the spindle motor outputs a braking torque to the optical disc, in which the braking torque has a magnitude the same as that of the rotational torque but a direction opposite to that of the rotational torque, no matter what the rotational angular velocity is, the rotation of the optical disc can always be ceased by a fixed period of time.

* * * * *